R. HITCHCOCK.
Winding Clocks.
No. 31,242.
Patented Jan. 29, 1861.
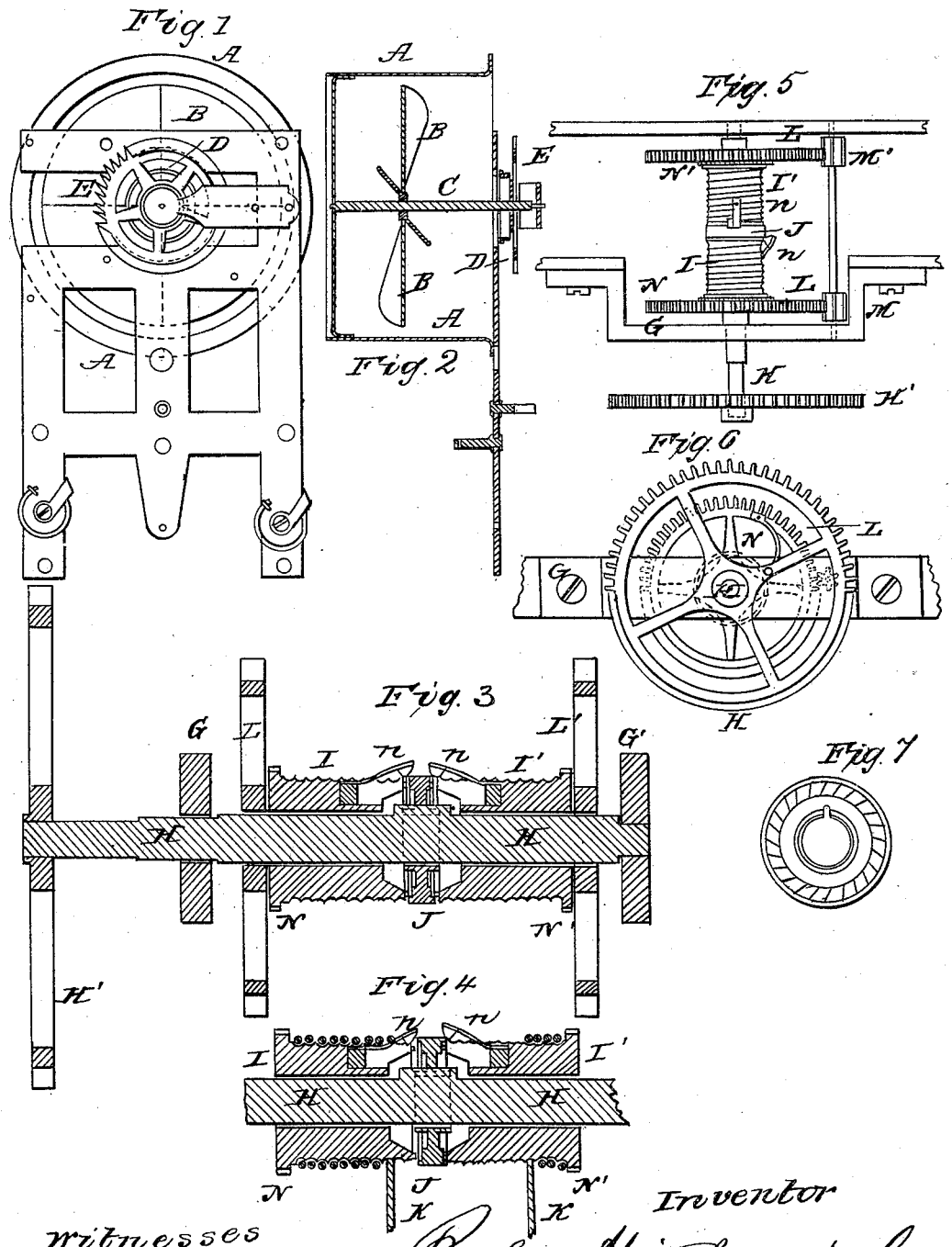
Witnesses
O. Bing
W. Fanfax
Inventor
Robert Hitchcock by
J. Pollak his atty

UNITED STATES PATENT OFFICE.

ROBERT HITCHCOCK, OF WATERTOWN, NEW YORK.

WINDING CLOCK.

Specification of Letters Patent No. 31,242, dated January 29, 1861.

*To all whom it may concern:*

Be it known that I, ROBERT HITCHCOCK, of Watertown, in the county of Jefferson and State of New York, have invented a new and useful Improvement in Clocks Whereby They May be Wound Automatically; and I do hereby declare that the following, taken in connection with the accompanying drawing, is a full and clear description thereof.

My present invention is applicable both to clocks in which the motive power is a spring and to clocks operated by a descending weight or weights in lieu of a spring.

Figures 1 and 2 of the accompanying drawing represent a front view and transverse vertical section of a house clock in part when operated by a spring with my invention applied to it.

In these figures (A) represents a rear portion of the clock case more or less open in front and behind and which may be made to project into a hole cut in the wall of the room in direct or indirect connection with the chimney or which may be otherwise disposed to set against or form communication with a chimney or other tubular shaft or its equivalent so as to induce a current of air through the clock for the purpose of giving motion to a flutter wheel (B) or substitute therefor capable of operation by a current or currents of air. This flutter wheel (B) may be of nearly the full diameter of the interior of the case part (A) of the clock case within which it is shown as arranged. Its wings or vanes may either be stationary or adjustable so as to admit of variation in their angular set or of opening and closing the air passages through or between them, but they are here shown as stationary. The object of this flutter wheel acted upon by a current or currents of air, as for instance obtainable by the natural draft of a chimney, is to wind automatically upon the clock spring so as to make the winding up of the clock by hand less frequent or to dispense with all hand winding thereof, but its application here is otherwise a peculiar one. Thus it may happen that the chimney with which the clock is made to communicate has naturally or permanently very little draft. To meet this obstacle and to keep the clock going for say a week or much longer interval of time than the clock spring by a single winding up of it is calculated to effect, and to obtain certain other advantages as hereinafter mentioned, I hang the flutter wheel (B) fast on the main spring arbor (C) which is extended for the purpose and employ only a small or weak and sensitive mainspring which lies within a box or barrel (D) and has its one end fast to the arbor and its other end to the barrel and the barrel hung to rotate on the arbor as in other spring driven clocks. And I further hang loose on the arbor (C) and in gear or fast connection with the spring barrel (D) the escapement wheel (E) of the clock and which is designed to be operated on by the pendulum in the ordinary or any suitable manner.

From such description it will be seen that excessive complication of mechanism and friction is avoided and that though the main spring is of so weak and limited a character as that it is only calculated to keep the clock going for a short interval of time, yet by the agency of the flutter wheel and the direct application of its power and the slight spring resistance only it has to overcome, a very light chimney draft or drafts will be sufficient to make the flutter wheel wind upon the spring so as to dispense with the rewinding of the latter by hand excepting at a comparatively long interval of time. By such an employment of parts too, and the direct connection of the escapement wheel of the clock with the mainspring or spring barrel, a clock is greatly simplified in construction as by it I am enabled to dispense with the main wheel and its arbor, second wheel and its pinion and arbor and third wheel with its pinion and arbor, also one face wheel and pinion and need only use two wheels and a pinion, the one of which is the escapement wheel that having sixty teeth in it may have a cogged attachment on its face of six teeth to operate a larger or minute wheel, concentric with which may be the hour pinion. These calculations are, of course, irrespective of any striking or other independent attachment to the clock.

By thus reducing parts and gear, not only may the manufacture of the clock be cheapened, but friction being diminished greater durability and accuracy is insured. By connecting the box part which contains the flutter wheel or propeller directly with the frame of the clock fitting together of independent parts is reduced and a greater steadiness given to the joint action of the flutter wheel with the clock, while, by constructing the clock case with an open front and back the current or currents of air which operate the flutter wheel serve to keep the clock works clean by blowing through them and carrying off any dirt that may be apt to lodge in the works. Connected with the main spring or spring arbor and thrown into gear by a cam or other device with the flutter wheel when the spring is wound up and out of gear therewith as the spring unwinds, is a brake or stop that acts to lock the flutter wheel by gearing with its stationary vanes and keep it from straining on the spring when the latter is sufficiently wound up by interrupting the further rotation of the flutter wheel.

To adapt my invention to town or other clocks in which a heavy descending weight is used in place of a spring to operate the clock, I so hang the weight or weights and wind upon them by the action of a flutter wheel or its equivalent operated by a draft or current or currents of air, as that though the driving weight or weights employed be of the usual heavy character yet the work to be performed by the flutter wheel is comparatively light, thus making the resistance to be overcome by the automatic winding attachment similar to that offered by a main spring as in the previous instance. And I so hang and operate the weight as that it offers the same facility for winding upon while the clock is going as does a main or driving spring and which an ordinary descending clock weight arrangement does not do, and this too without interfering with the time keeping performance of the clock as is generally or always done in winding up the clock weight, by reason of the reversal of the power and running back of the works which then takes place, amounting usually and as a consequence of the friction induced, to some six beats in the back run of the works and six more on their return after the clock is wound and set going.

Referring to the accompanying drawing to illustrate this part or modification of my invention, Figs. 3 and 4 represent vertical longitudinal sections of the windlass or barrel on which the rope of the descending weight is wound, with certain gearing pertaining thereto; Figs. 5 and 6, plan and side or end view of the same; and Fig. 7 a face view of the intermediate collar on the windlass shaft.

Here, (G) represents the windlass or barrel frame and (H) the barrel shaft which is the equivalent of a main spring arbor and is to be acted upon by a flutter wheel or its equivalent to wind upon the clock weight through gear (H′) or otherwise as and through the intervention of a current or currents of air, the main spring in a spring driven clock as previously described was operated upon, to keep the clock going for a longer interval of time than is due to the descending weight in the ordinary mode of running it down. The windlass or barrel is made in two sections (I, I′) one on either side of a collar (J) that is capable of longitudinal movement on the barrel shaft (H) but geared so as to turn with it. The two barrel sections (I I′) are loose on the barrel shaft, but are thrown into alternate gear therewith substantially as hereinafter described.

The rope or chain (K) which carries the clock operating weight is made fast at its one end to the one barrel section (I) and at its other end to the other barrel section (I′) so as to form a sling to carry the clock weight by means (say) of a wheel or roller having the weight suspended to it. Both barrel sections (I I′) are grooved helically to facilitate the winding and unwinding of the rope upon them. Either barrel section (I I′) becomes alternately the driver of the clock works by means of gear (L L′) operating pinions (M M′) on the shaft of which the balance or fly is fixed, said wheels (L L′) being made alternately to rotate, either one, with its respective barrel section (I I′) and independently of it, by means of pawls and ratchet wheels (N N′) accordingly as each barrel section is alternately the driver of the clock works by the unwinding of the rope carrying the weight from it, the other barrel section (either one alternately) being simultaneously employed in winding up the rope on the other side to make it the driver of the clock works in its turn. The gearing of either barrel section alternately with the windlass shaft (H) to make it wind the rope for continuance of the work by the operation of the flutter wheel in gear with said shaft, is made automatic and by the action of the rope in winding on either barrel by means of the sliding collar (J) which, accordingly as the rope completes its winding on either barrel section is pushed into gear with the barrel from which the rope has unwound by means of spring latches (n, n) on either barrel section and which the rope in winding up depresses and so urges the collar into gear with the other barrel, said collar having teeth on both its sides or faces to effect its gear alternately with either barrel. In this way the clock may be kept going by the action of the weight and flutter wheel combined for a much longer interval, than it could do if simply operated by the weight in the ordinary manner, and the lift of the weight is made easy to the flutter wheel; also, in lifting the weight in the manner described to continue the work the time keeping properties of the clock are not interfered with.

I claim as new and useful in this my invention—

1. The arrangement of the flutter wheel or its equivalent, main spring with its drum or barrel and escapement wheel of the clock upon one and the same shaft.

2. The employment, in combination with a winding up flutter wheel or its equivalent, of a weight or weights as a substitute for the main spring of the clock, by suspending the weight as described and alternately winding and unwinding it on and from distinct barrels or barrel sections thrown into alternate gear with the barrel shaft, substantially as described.

In testimony whereof I have signed my name to this specification before two subscribing witnesses.

Washington, February 28, 1860.

ROBT. HITCHCOCK.

Witnesses:
 A. POLLAK,
 A. J. DE ZEYK.